(12) United States Patent
Han et al.

(10) Patent No.: US 7,904,106 B2
(45) Date of Patent: Mar. 8, 2011

(54) METHOD AND APPARATUS OF ADAPTIVELY ALLOCATING TRANSMISSION POWER FOR BEAMFORMING COMBINED WITH ORTHOGONAL SPACE-TIME BLOCK CODES BASED ON SYMBOL ERROR RATE IN DISTRIBUTED WIRELESS COMMUNICATION SYSTEM

(75) Inventors: Shuangfeng Han, Suwon-si (KR); Seong-Taek Hwang, Pyeongtaek-si (KR); Hoon Kim, Suwon-si (KR); Sang-Ho Kim, Suwon-si (KR); Jae-Hun Cho, Suwon-si (KR); Jae-Hoon Lee, Seoul (KR); Ki-Uk Song, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 675 days.

(21) Appl. No.: 11/974,402

(22) Filed: Oct. 12, 2007

(65) Prior Publication Data

US 2008/0117961 A1    May 22, 2008

(30) Foreign Application Priority Data

Nov. 22, 2006   (KR) .................. 10-2006-0115851

(51) Int. Cl.
| | |
|---|---|
| *H04B 1/04* | (2006.01) |
| *H04B 7/02* | (2006.01) |
| *H04B 7/00* | (2006.01) |
| *H04B 7/185* | (2006.01) |
| *H04B 1/02* | (2006.01) |
| *H04B 17/00* | (2006.01) |
| *H04B 1/66* | (2006.01) |
| *H04B 3/46* | (2006.01) |
| *H03C 7/02* | (2006.01) |
| *H04M 1/00* | (2006.01) |
| *H04L 27/00* | (2006.01) |
| *H01Q 3/00* | (2006.01) |

(52) U.S. Cl. ......... 455/522; 455/101; 455/102; 455/103; 455/562.1; 370/318; 375/227; 375/229; 342/372; 342/368; 342/371

(58) Field of Classification Search ................. 455/101, 455/102, 103, 562.1, 522; 370/318; 375/227, 375/299; 342/372, 368, 371
See application file for complete search history.

(56) References Cited

U.S. PATENT DOCUMENTS 7,205,937 B2 *  4/2007  Hein .............................. 342/372

(Continued)

FOREIGN PATENT DOCUMENTS

KR   2004-108815   12/2004

(Continued)

*Primary Examiner* — Matthew D Anderson
*Assistant Examiner* — Bobbak Safaipour
(74) *Attorney, Agent, or Firm* — Cha & Reiter, LLC

(57) ABSTRACT

Disclosed is an apparatus and method for adaptively allocating transmission power for beamforming combined with orthogonal space-time block codes (OSTBC) in a distributed wireless communication system, the apparatus comprising: a plurality of sub-arrays for beamforming, which are geographically distributed and each of which comprises a plurality of distributed antennas placed in random groups; and a central processing unit for identifying performances of subsets by applying a predetermined power allocation scheme according to subsets which can be obtained by combining the sub-arrays, by means of a Nakagami fading parameter and information about large-scale fading of each of the sub-arrays, fed back from a receiving party, for determining a subset having a best performance as an optimal subset according to the identified performances, and for performing power allocation based on the subset set as the optimal subset.

7 Claims, 5 Drawing Sheets

U.S. PATENT DOCUMENTS

| | | | |
|---|---|---|---|
| 7,545,323 B2 * | 6/2009 | Kalian et al. | 342/372 |
| 7,545,324 B2 * | 6/2009 | Kalian et al. | 342/372 |
| 7,711,330 B2 * | 5/2010 | Yang et al. | 455/101 |
| 2001/0038356 A1 | 11/2001 | Frank | |
| 2003/0190897 A1 * | 10/2003 | Lei et al. | 455/101 |
| 2004/0082356 A1 * | 4/2004 | Walton et al. | 455/522 |
| 2005/0207475 A1 * | 9/2005 | Bar-Ness et al. | 375/141 |
| 2007/0096982 A1 * | 5/2007 | Kalian et al. | 342/377 |
| 2008/0013638 A1 * | 1/2008 | Walton et al. | 375/260 |
| 2008/0117961 A1 * | 5/2008 | Han et al. | 375/227 |

FOREIGN PATENT DOCUMENTS

| | | |
|---|---|---|
| KR | 2005-27186 | 3/2005 |
| KR | 2006-49146 | 5/2006 |

* cited by examiner

METHOD AND APPARATUS OF ADAPTIVELY ALLOCATING TRANSMISSION POWER FOR BEAMFORMING COMBINED WITH ORTHOGONAL SPACE-TIME BLOCK CODES BASED ON SYMBOL ERROR RATE IN DISTRIBUTED WIRELESS COMMUNICATION SYSTEM

CLAIM OF PRIORITY

This application claims the benefit under 35 U.S.C. 119(a) of an application entitled "Method And Apparatus Of Adaptively Allocating Transmission Power For Beamforming Combined With Orthogonal Space-Time Block Codes Based On Symbol Error Rate In Distributed Wireless Communication System," filed in the Korean Intellectual Property Office on Nov. 22, 2006 and assigned Serial No. 2006-115851, the entire contents of which are incorporated herein by reference.

BACKGROUND OF THE INVENTION

1. Field of the Invention

The present invention relates to a distributed-input distributed-output wireless communication system using space-time coding techniques, and more particularly to a method of adaptively allocating transmission power for beamforming combined with orthogonal space-time block codes based on a symbol error rate (SER).

2. Description of the Related Art

A relatively new development in wireless technology is known as spatial multiplexing and space-time coding. One particular type of space-time coding is called "MIMO (Multiple Input Multiple Output)," which uses a plurality of antennas to transmit/receive signals so that a plurality of independent radio waves can be transmitted at the same time within the same frequency range.

Fundamentally, MIMO technology is based on the use of spatially distributed antennas by generating parallel spatial data streams within a common frequency band. The radio waves are transmitted in such a manner that although the individual signals are transmitted in the same frequency, they are separated and demodulated in a receiver so as to produce a plurality of statistically independent (i.e., effectively separate) communication channels. Thus, in contrast to a standard wireless communication system which inhibits a multi-path signal (i.e., multiple signals of the same frequency, which are delayed in time, and modified in amplitude and phase), the MIMO can depend on almost uncorrelated (or weakly-correlated) multi-path signals in order to achieve a higher throughput and an improved signal-to-noise ratio within an appropriate frequency band.

In one particular application of the MIMO-type technology, a theoretical result presented in the following reference documents [1] and [2] has proved that distributed antennas (DAs) are more profitable than a co-located multiple-input multiple-output (C-MIMO) channel in terms of capacity. However, thorough research has not yet been devoted to a method for obtaining sufficient advantage of the DAs in terms of a capacity. In order to create such a method, a concept for a distributed wireless communication system (DWCS) is proposed in reference document [3] mentioned below, in which the DWCS is expected to greatly increase system capacity because the system can process transmit and receive signals together.

In the DWCS, combining beamforming with orthogonal space-time block codes (OSTBC) as disclosed in reference document [4] mentioned below, a very encouraging result is produced because of the use of macro-diversity (from the DAs), transmission/reception densities (from the OSTBC) and an array gain (from the beamforming). Previous research related to this method has mostly been done in consideration of the same large-scale fading (i.e., shadowing and path loss) scenario. However, large-scale fading from a mobile terminal (MT) to geographically distributed DAs may greatly differ in a real system, which means that it is uneconomical to equally allocate the transmission power. Therefore, it is necessary to allocate the transmission power based on channel state information (CSI).

FIG. 1 is a block diagram illustrating the configuration of a transmission apparatus in which the orthogonal space-time block coding (OSTBC) and beamforming are combined in a conventional distributed wireless communication system. Data symbols to be transmitted by a transmitting party are modulated using a predetermined modulation scheme, and are input into a space-time encoder 100 so as to be space-time encoded. Thereafter, the encoded data symbols are presented to a plurality of geographically distributed sub-arrays 111, and beamforming is performed for the respective symbols. As shown in FIG. 1 (and as adopted in reference documents [5] and [6] mentioned below), conventional transmission methods for beamforming combined with the OSTBC have been designed based on the following assumptions.

A part of geographically-distributed sub-arrays have separated base station antennas for beam-forming. It is assumed that the same large-scale fading from an MT 120 to each sub-array 111 is the same.

Half-wavelength spacing is used for antennas within each sub-array 111. There is a signal path from the MT 120 to each sub-array 111, and channels viewed by the antennas in a given sub-array 111 are perfectly correlated by an array response vector. The array response vector can be estimated using feedback or other direction-of-arrival (DOA) estimation schemes.

A corresponding normalized array response vector is directly used as a beamforming weight vector for a $j^{th}$ sub-array $111_j$. A perfect beamforming is assumed for the $j^{th}$ sub-array $111_j$ so as to obtain the maximum aperture gain "$q_j$" (wherein, the aperture gain may be regarded as an increase in the average signal power in a desired direction, which is achieved by an antenna array with respect to one antenna, where it is assumed that the overall power transmitted from both systems is the same).

The sub-arrays are sufficiently separated from each other such that a signal from each transmission sub-array 111 experiences independent fading. In this case, the sub-arrays 111 may be regarded as equivalent transmission units. The OSTBC is applied to the equivalent transmission units so as to achieve transmit diversity. An equal-power allocation scheme is adopted.

Channels are assumed to be quasi-static flat Rayleigh fading channels.

The system is fully synchronized.

There is only one receiving antenna.

However, there are the following problems in the conventional transmission method for the OSTBC and beamforming, as shown in FIG. 1:

1) The Rayleigh fading is applied only to a non-line-of-sight (NLOS) communication scenario. However, owing to the distribution of the DAs, there may be some cases where a line-of-sight (LOS) signal exists in the DWCS. As Nakagami fading is a more general fading model, the Nakagami fading must be considered instead.

2) Large-scale fading from an MT to geographically-distributed DAs may greatly differ in an actual system. Therefore, the equal-power allocation may incur an unacceptable level of performance. It is necessary to optimally allocate the transmission power.

3) It is assumed that there is the same number of antennas in each sub-array. In an actual system, it is necessary to adaptively configure the number of antennas of each sub-array in accordance with communication environments.

SUMMARY OF THE INVENTION

Accordingly, the present invention provides a method of providing an optimal power allocation scheme for beamforming combined with orthogonal space-time block codes (OSTBC) in a distributed wireless communication system (DWCS) so as to achieve an optimum performance. Also, the present invention provides a method for minimizing a symbol error rate in a given target data rate and an overall transmission power by providing an adaptive transmission power allocation scheme which combines beamforming with orthogonal space-time block codes (OSTBC) in a flat Nakagami fading channel within a distributed wireless communication system (DWCS).

Further, another embodiment of the present invention provides an apparatus for adaptively allocating transmission power that combines beamforming with orthogonal space-time block codes (OSTBC) in a distributed wireless communication system, the apparatus comprising: a plurality of sub-arrays for beamforming, which are geographically distributed and each of which comprises a plurality of distributed antennas placed in random groups; and a central processing unit for identifying a performance of each of at least one subset by applying a predetermined power allocation scheme according to the at least one subset which is obtained by combining the sub-arrays, by means of a Nakagami fading parameter and information about large-scale fading of each of the sub-arrays, fed back from a receiving party, for setting at least one subset having a best performance as an optimal subset according to the identified performances, and for performing power allocation based on the at least one subset set as the optimal subset.

An alternative embodiment of the present invention provides a method for adaptively allocating transmission power for combining beamforming with orthogonal space-time block codes (OSTBC) in a distributed wireless communication system that includes a plurality of geographically-distributed antenna sub-arrays for beamforming, each antenna sub-array comprising a plurality of distributed antennas placed in random groups, the method comprising the steps of: estimating a direction-of-arrival (DOA) for each antenna sub-array of said plurality and creating an array response vector for each antenna sub-array; allocating transmission power proportional to a Nakagami fading parameter "m" for each antenna sub-array according to at least one subset obtained by combining the plurality of antenna sub-arrays, by means of the Nakagami fading parameter and information about large-scale fading of each sub-array of the plurality of antenna sub-arrays, fed back from a receiving party, and obtaining symbol error rates according to the at least one obtained subset; and setting a subset having a lowest rate of an obtained symbol error rate as an optimal subset, and performing power allocation based on the subset set as the optimal subset.

BRIEF DESCRIPTION OF THE DRAWINGS

The above and other features and advantages of the present invention will be more apparent from the following detailed description taken in conjunction with the accompanying drawings, in which.

DETAILED DESCRIPTION

Hereinafter, one embodiment of the present invention is described with reference to the accompanying drawings. In the below description, many particular items such as a detailed component device are shown, but these are given only for providing the general understanding of the present invention, it will be understood by those skilled in the art that the present invention can be embodied without including these particular items.

The present invention provides a symbol-error-rate (SER)-based adaptive transmission power allocation scheme for beamforming combined with orthogonal space-time block coding (OSTBC) within a flat Nakagami fading channel in a distributed wireless communication system, based on large-scale fading information (pathloss and shadowing) fed back from a receiver to a transmitter and a Nakagami fading parameter.

According to the present invention, the transmitter estimates a direction-of-arrival (DOA) of a mobile terminal (MT) for a plurality of geographically distributed antenna sub-arrays, performs beamforming within each sub-array of the plurality, and achieves an array gain by using an estimated array response vector. OSTBC symbols are transmitted to each sub-array of the plurality to achieve transmit diversity.

According to the present invention, the number of antennas for each sub-array is flexibly established depending on a communication environment. In case of a higher-density communication area, more antennas may be disposed in a corresponding sub-array.

The Nakagami fading parameters "m" for each sub-array of the plurality need not be equal to each other.

A subset of transmission antennas corresponds to a combination of at least one sub-array of the plurality. The power allocation scheme according to the present invention is provided to select a best subset for optimal power allocation.

According to a quasi-optimal power allocation scheme for a subset of transmission antennas based on the present invention, transmission power is allocated either by using a water pouring algorithm "PAS1" or simply in proportion to the Nakagami fading parameter "m" of each sub-array. Such a transmission allocation is very near to an optimal power allocation at a high transmission power level.

According to the present invention, a subset of antennas is selected based on the quasi-optimal power allocation for each subset of antennas, so that it is possible to select a subset having the best SER performance for transmission, which is near to the optimal performance at the transmission power level.

Hereinafter, one exemplary embodiment of the present invention is described in detail with reference the accompanying drawings.

[System Model]

Figure 1:
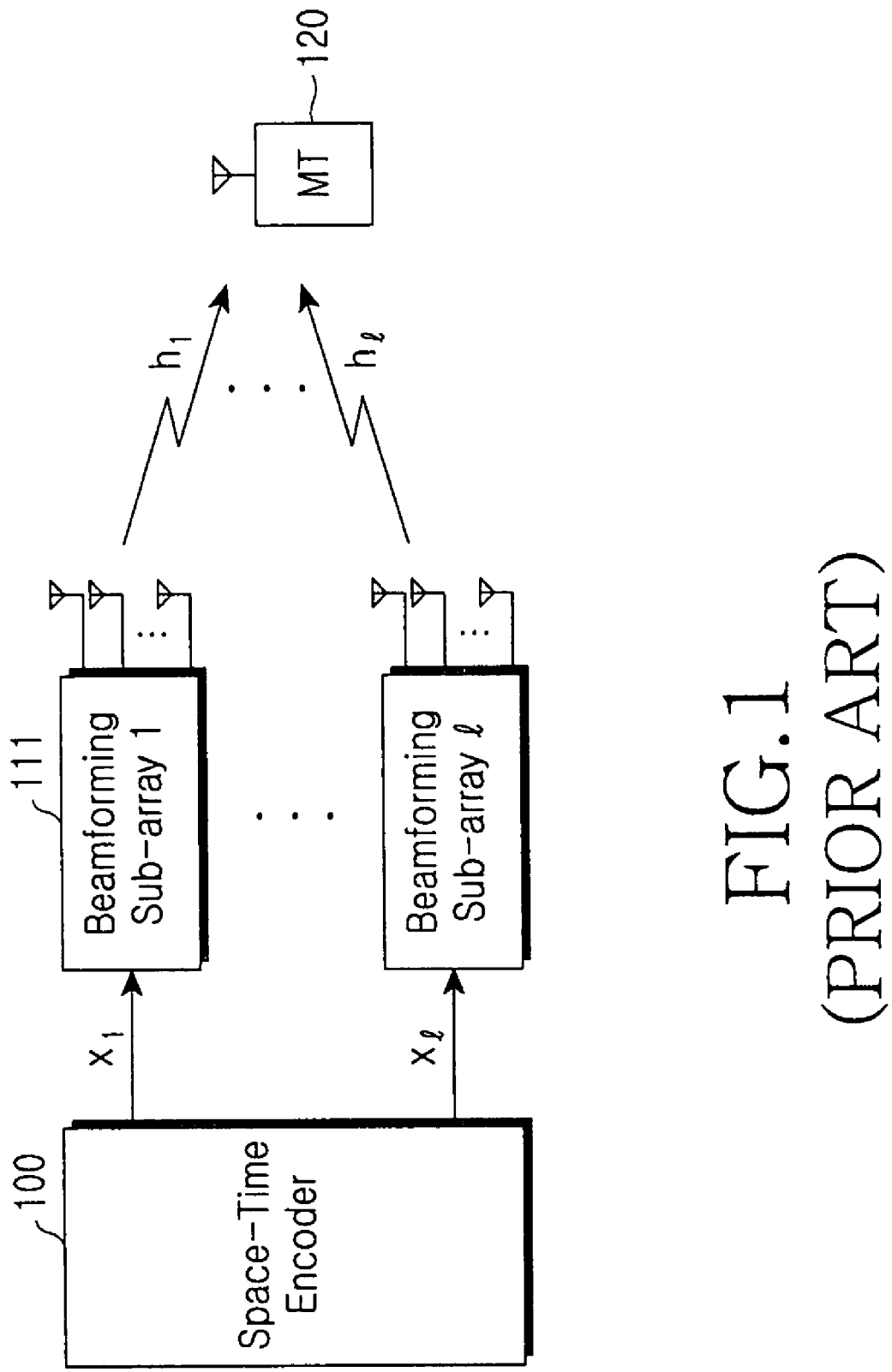
FIG. 1 is a block diagram illustrating the configuration of a transmission apparatus where the orthogonal space-time block codes (OSTBC) and beamforming are combined in a conventional distributed wireless communication system.
Figure 2:
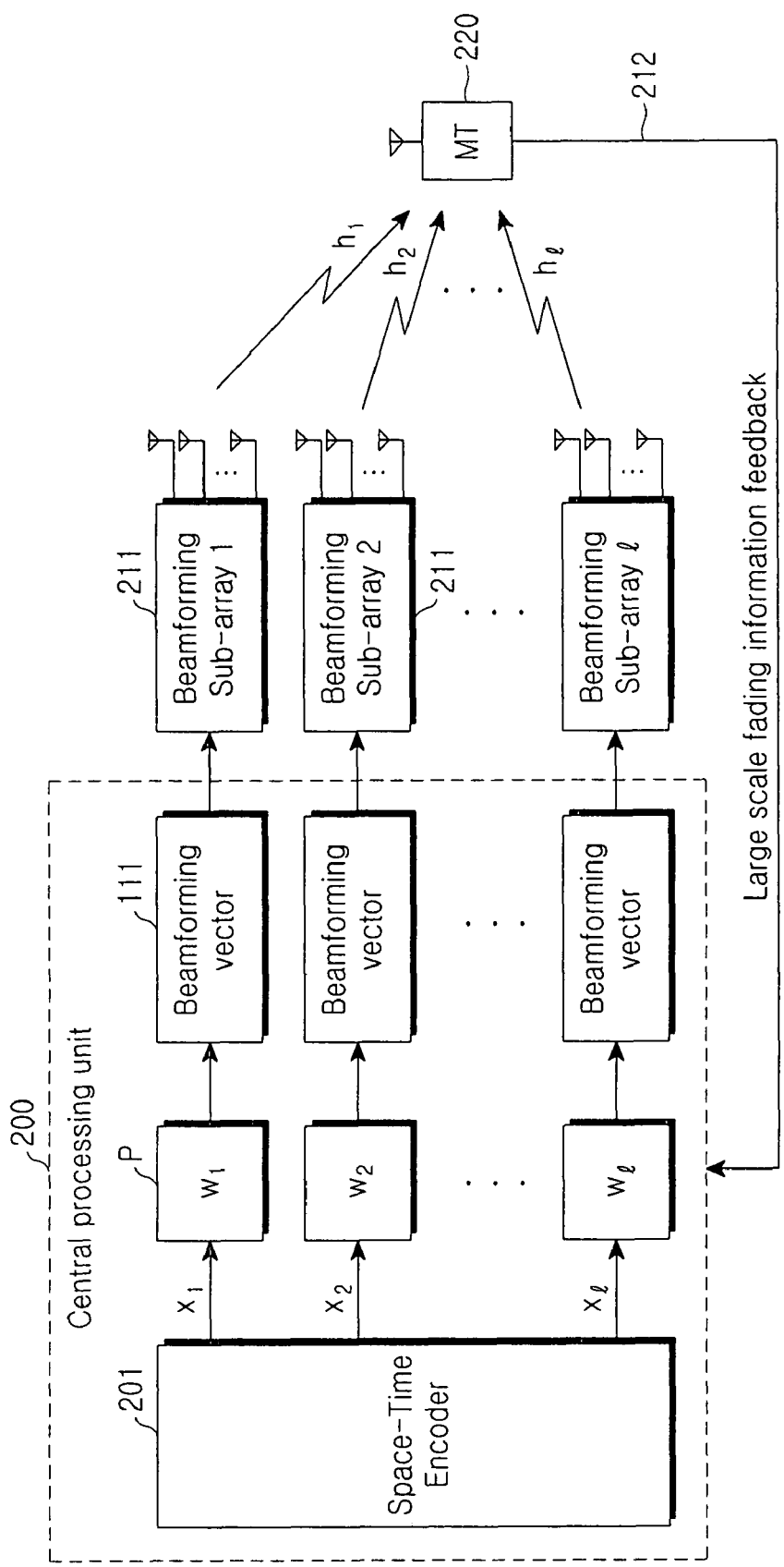
FIG. 2 is a block diagram illustrating the configuration of a transmission apparatus where the OSTBC and beamforming are combined in a distributed wireless communication system according to an embodiment of the present invention.

FIG. 2 is a block diagram illustrating the configuration of a transmission apparatus where the OSTBC and beamforming are combined in a distributed wireless communication system (DWCS), according to an embodiment of the present invention, wherein a downlink single user $(n, 1, q_1, \ldots, q_l, 1)$ DWCS is considered. According to the present invention, the transmission apparatus includes l number of beamforming sub-arrays 211 which are geographically distributed, in which each sub-array 211 is equipped with n number of DAs which are randomly grouped. Herein, $q_j$ number of DAs are arranged in a $j^{th}$ sub-array 211 (wherein, j=1, 2, ..., l), $$\sum_{j=1}^{l} q_j = n,$$

and an MT 220 includes one antenna. All DAs are independently connected to a central processing unit 200 for processing transmit/receive signals of the DAs. Generally, the macroscopic and microscopic fading of different DA sub-arrays 211 are mutually independent.

Half-wavelength spacing is used for antennas within each sub-array 211. It is assumed that there is a signal path from the MT 220 to each sub-array 211, and channels viewed by the antennas in a given sub-array 211 are perfectly correlated by an array response vector. The array response vector can be estimated using a direction-of-arrival (DOA) estimation scheme. A corresponding normalized array response vector is directly used as a beamforming weight vector for a $j^{th}$ sub-array 211. A perfect beamforming is assumed for the $j^{th}$ sub-array 211 so as to obtain the maximum aperture gain "$q_j$." In this case, the sub-arrays 211 may be regarded as equivalent transmission units. The OSTBC is applied to the equivalent transmission units so as to achieve transmit diversity.

According to the present invention, the central processing unit 200 first obtains an optimal subset of transmission antennas (i.e., a combination of antenna sub-arrays) which provides an optimal power allocation. Then, an OSTBC symbol with a unit average power is created by a space-time encoder 201, and is multiplied by a power allocation matrix "P" before being transmitted. It is assumed that the power allocations within each of the sub-arrays 211 are equal. Therefore, the diagonal power allocation matrix "P" can be expressed as $P=diag(\sqrt{w_1}, \sqrt{w_2}, \ldots, \sqrt{w_l})$, wherein $w_j$ (where j=1, ..., l) represents the power allocation weight for a $j^{th}$ sub-array, and $$\sum_{j=1}^{l} w_j = 1.$$

It is assumed that the frequencies of channels are flat and a receiver can use perfect channel state information (CSI). Information about large-scale fading of each sub-array 211 and a Nakagami fading parameter is fed back 212 to the transmitting party.

Figure 3:
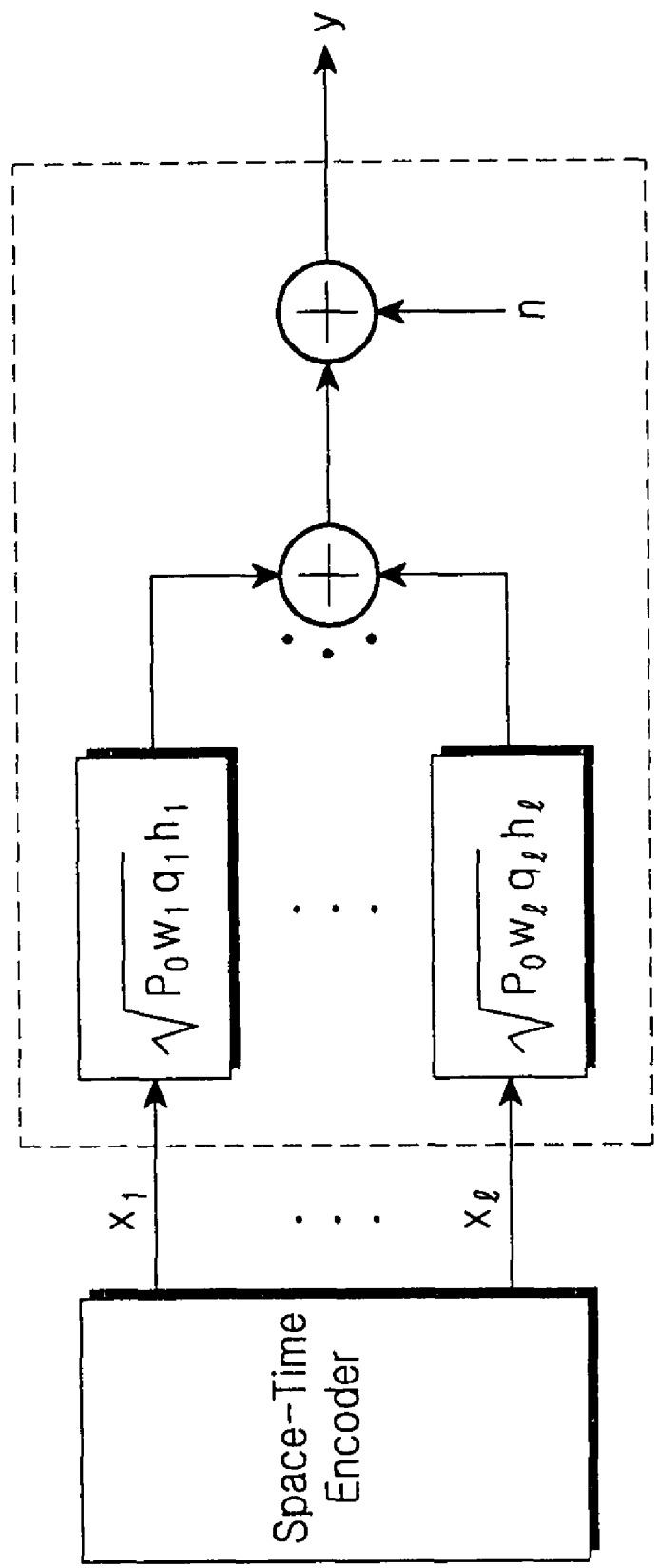
FIG. 3 is a view illustrating the valid input and output relationship of an OSTBC transmission scheme in the distributed wireless communication system according to an embodiment of the present invention.

FIG. 3 is a view illustrating a valid input and output relationship of the OSTBC transmission scheme in a distributed wireless communication system according to an embodiment of the present invention. According to the present invention, the valid input and output relationship can be expressed by the following Equation (1)

$$y=\sqrt{P_o}HBPx+n \qquad (1)$$

Herein, y and x represent receive and transmit vectors, n represents a complex noise $N(0, \sigma^2)$, and $P_o$, represents an overall average transmission power. Accordingly, $P_o/\sigma^2$ results in a TSNR (transmit power to receive noise ratio) that is denoted by "$\rho$." A diagonal matrix B corresponds to a beamforming gain matrix and can be expressed as $B=diag(\sqrt{q_1}, \ldots, \sqrt{q_l})$. A channel gain from a $j^{th}$ transmission antenna sub-array to a receiver antenna is expressed as $h_j=\beta_j e^{i\theta_j}$, wherein the $\theta_j$ is uniformly distributed over $[0,2\pi]$. $\beta_j$ represents a Nakagami distributed random variable, and a probability density function (PDF) thereof is expressed by the following Equation (2)

$$f_{\beta_j}(x) = \frac{2}{\Gamma(m_j)}\left(\frac{m_j}{\Omega_j}\right)^{m_j} x^{2m_j-1} e^{-\frac{m_j}{\Omega_j}x^2} \qquad (2)$$

Herein, $\Omega_j=E(\beta_j^2)$ represents an average power of $h_j$, and $m_j$, represents a Nakagami fading parameter. Generally, $m_j \geq \frac{1}{2}$, which represents the magnitude of fading. It is necessary to note that $\Omega_j$ (wherein j=1, ..., l) represents a large-scale fading for a $j^{th}$ antenna sub-array. It is assumed that the transmitter has been notified of the large-scale fading, together with the Nakagami distributed random variable, through feedback from the receiver. It is assumed that the large-scale fading is equal in general point-to-point MIMO channels, because antennas share locations. However, the large-scale fading may be greatly changed due to the geographical distribution in the DWCS according to the present invention.

A subset of transmission antennas is defined as a random combination of DA sub-arrays. Herein, as the number of the sub-arrays is l, there exist a total of "$2^l-1$" subsets, which are denoted by $A_1, \ldots, A_{2^l-1}$. For example, it is assumed that a subset $A_l$ includes a total of l ports. The rate of the OSTBC is denoted by r, wherein $r=n_s/T$, and $n_s$ independent data streams are transmitted during T consecutive symbol durations. Since the rates of subsets may differ, it is assumed that there is only one rate, i.e., $r_k$ (where k=1, ..., $2^l-1$) for subsets $A_k$, for convenience of description. In order to transmit data at the same data rate, different antenna subsets may use different symbol constellations. In the present invention, $q_k$ of quadrature amplitude modulation (QAM) and a phase shift keying (PSK) symbol of a subset $A_k$, are regarded as constellation points. For example, when data are transmitted at 3 bits/s through 4 antenna sub-arrays using the ¾ rate of the OSTBC, a modulation type of 16 QAM or 16 PSK may be used.

[SER Induction Using M-QAM and M-PSK]

In the case of beamforming combined with OSTBC without being coded in a flat Nakagami fading channel, an SER functions as an effective measure of performance. Therefore, the present invention provides a power allocation scheme capable of optimizing transmission through minimization of the SER. When it is assumed that modulation schemes of $M_l$-QAM and $M_l$-PSK are employed, the SER of a subset $A_l$ of which rate is $r_l$ is derived as follows.

The SNR η may be derived as the following equation (3)

$$\eta = \|HBP\|_F^2 \rho = \sum_{j=1}^{l} \beta_j^2 w_j q_j \rho = \sum_{j=1}^{l} \eta_j \qquad (3)$$

Herein, $\eta_j$ represents a gamma distribution random variable, the PDF of which is expressed as the following Equation (4)

$$f_{\eta_j}(x) = \frac{1}{\Gamma(m_j)} \left( \frac{m_j}{\Omega_j w_j q_j \rho} \right)^{m_j} x^{m_j - 1} e^{-\frac{m_j}{\Omega_j w_j q_j \rho} x} \qquad (4)$$

The moment generation function (MGF) of η is derived as the following Equation (5)

$$\Phi_\eta(s) = \prod_{j=1}^{l} \Phi_{\eta_j}(s) \qquad (5)$$

$$= \prod_{j=1}^{l} (1 - s \Omega_j w_j q_j \rho / m_j)^{-m_j}$$

$$= \sum_{j=1}^{l} \sum_{k=1}^{m_j} T_{j,k} (1 - s \Omega_j w_j q_j \rho / m_j)^{-k}$$

$$= \sum_{j=1}^{l} \sum_{k=1}^{m_j} T_{j,k} \Phi_{j,k}$$

Herein, a coefficient $q_{j,k}$ can be obtained by using a partial fraction $$T_{j,k} = \frac{(-i\Omega_j w_j q_j \rho / m_j)^{-(m_j - k)}}{(m_j - k)!} \qquad (6)$$

$$\frac{\partial^{m_j-k}}{\partial s^{m_j-k}} \left( \prod_{u=1, u \neq j}^{l} \left(1 - \frac{s \Omega_u w_u q_u \rho}{m_u}\right)^{-m_u} \right)_{s = \frac{m_j}{i\Omega_j w_j q_j \rho}}.$$

Therefore, the PDF of η can be obtained through inverse transformation into $\Phi_\eta(s)$ $$f_\eta(x) = \sum_{j=1}^{l} \sum_{k=1}^{m_j} \frac{1}{\Gamma(k)} T_{j,k} (\Omega_j w_j q_j \rho / m_j)^{-k} x^{k-1} e^{-x m_j / \Omega_j w_j q_j \rho} \qquad (7)$$

From Equation (7), an exact order closed-form SER of $M_l$-QAM and $M_l$-PSK coefficients in the OSTBC over C-MIMO fading channels may be derived and expressed as the following Equations (8) and (9)

$$P_{eM_lQAM} = \sum_{j=1}^{l} \sum_{k=1}^{m_j} T_{j,k} \left( \frac{4\delta_l}{\pi} \int_0^{\pi/2} \Phi_{j,k} \left( -\frac{g_{M_lQAM}}{\sin^2\theta} \right) d\theta - \right. \qquad (8)$$

$$\frac{4\delta_l^2}{\pi} \int_0^{\pi/4} \Phi_{j,k} \left( -\frac{g_{M_lQAM}}{\sin^2\theta} \right) d\theta \right)$$

$$= \sum_{j=1}^{l} \sum_{k=1}^{m_j} T_{j,k} \left( \Phi_{j,k}(-g_{M_lQAM}) \frac{2\delta_l}{\sqrt{\pi}} \frac{\Gamma(k+1/2)}{\Gamma(k+1)} {}_2F_1 \right.$$

$$\left( k, 1/2; k+1; \frac{1}{1 + g_{M_lQAM} \Omega_j w_j q_j \rho / m_j} \right) -$$

$$\sum_{j=1}^{l} \sum_{k=1}^{m_j} T_{j,k} \left( \Phi_{j,k}(-2g_{M_lQAM}) \frac{2\delta_l^2}{\pi(2k+1)} F_1 \right.$$

$$\left( 1, k, 1; k+3/2; \frac{m_j + g_{M_lQAM} \Omega_j w_j q_j \rho}{m_j + 2g_{M_lQAM} \Omega_j w_j q_j \rho}, 1/2 \right) \right)$$

-continued $$P_{eM_lPSK} = \sum_{j=1}^{l} \sum_{k=1}^{m_j} T_{j,k} \left( \frac{1}{\pi} \int_0^{\pi/2} \Phi_{j,k} \left( -\frac{g_{M_lPSK}}{\sin^2\theta} \right) d\theta + \right. \qquad (9)$$

$$\frac{1}{\pi} \int_{\pi/2}^{(M_l-1)\pi/M_l} \Phi_{j,k} \left( -\frac{g_{M_lPSK}}{\sin^2\theta} \right) d\theta \right)$$

$$= \sum_{j=1}^{l} \sum_{k=1}^{m_j} T_{j,k} \left( \Phi_{j,k}(-g_{M_lPSK}) \frac{1}{2\sqrt{\pi}} \frac{\Gamma(k+1/2)}{\Gamma(k+1)} {}_2F_1 \right.$$

$$\left( k, 1/2; k+1; \frac{1}{1 + g_{M_lPSK} \Omega_j w_j q_j \rho / m_j} \right) +$$

$$\sum_{j=1}^{l} \sum_{k=1}^{m_j} T_{j,k} \left( \Phi_{j,k}(-g_{M_lPSK}) \frac{\sqrt{1 - g_{M_lPSK}}}{\pi} F_1 \right.$$

$$\left( \frac{1}{2}, k, \frac{1}{2} - k; \frac{3}{2}; \frac{1 - g_{M_lPSK}}{1 + g_{M_lPSK} \Omega_j w_j q_j \rho / m_j}, 1 - g_{M_lPSK} \right) \right)$$

Herein, $$F_1(a, b_1, b_2; c, x, y) = \sum_{n=0}^{\infty} \sum_{k=0}^{\infty} (a)_{n+k} (b_1)_n (b_2)_k x^n y^k / ((c)_{n+k} n! k!),$$

$$(a)_n = \Gamma(a+n)/\Gamma(a),$$

$${}_2F_1(a, b; c; x) = \sum_{n=0}^{\infty} (a)_n (b)_n x^n / ((c)_n n!),$$

$$g_{M_lQAM} = \frac{1.5}{(M_l - 1)},$$

$$\delta_l = 1 - \frac{1}{\sqrt{M_l}}, \text{ and } g_{M_lPSK} = \sin^2\left(\frac{\pi}{M_l}\right).$$

Also, the SER for the OSTBC transmitted through other subsets can be obtained. The present invention provides a method capable of minimizing the SER in each subset through optimal power allocation to each sub-array and through selection of a subset capable of providing the best SER performance upon transmission. However, since it is difficult to directly minimize the SER, the present invention employs the following quasi-optimal scheme.

[Quasi-Optimal Power Allocation for MQAM Symbol]

An SER of OSTBC having an MQAM constellation is expressed as the following Equation (10).

$$P_{MQAM} = 1 - \left( 1 - \int_0^\infty 2\left(1 - \frac{1}{\sqrt{M}}\right) Q\left(\sqrt{\frac{3}{M-1}} x\right) f_\eta(x) dx \right)^2 \qquad (10)$$

According to the present invention, when an optimal subset for STBC transmission in a given transmission scenario is unknown, a subset $A_g$ including sub-arrays 1, 2, . . . , g (where $1 \leq g \leq 2^l - 1$) is regarded as an optimal subset having optimal power allocation weights $w_1, \ldots, w_g$ (where one or more weights may have a value of "0"). When the Chernoff bound is applied to Q-function, i.e., $Q(x) \leq \exp(-x^2/2)$, the upper bound of an SER in the combined scheme having an MgQAM symbol may be expressed as the following Equation (11)

$$P_{M_gQAM} \leq 1 - \left( 1 - 2\left(1 - \frac{1}{\sqrt{M_g}}\right) \int_0^\infty e^{-2\left(\frac{3}{M_g-1}\right)x} f_\eta(x) dx \right)^2 \qquad (11)$$

-continued $$= 1 - \left(1 - 2\left(1 - \frac{1}{\sqrt{M_g}}\right)\prod_{j=1}^{g}\right.$$
$$\left.\left(1 + \frac{3}{2(M_g-1)}\Omega_j w_j q_j \rho/m_j\right)^{-m_j}\right)^2$$

In the present invention, it is noted that minimizing such an upper bound through allocation of an optimal transmission power corresponds to an optimization problem described by the following Equation (12)

$$w^* = \operatorname{argmax} \prod_{j=1}^{g}\left(1 + \frac{3}{2(M_g-1)}\Omega_j w_j q_j \rho/m_j\right)^{m_j} \quad (12)$$

A maximizing expression corresponds to a concave function by variable $w_j$, which can be maximized by using the Lagrangian method. Function F is defined by the following Equation (13)

$$F(w_1, w_2, \ldots w_g, u) = \quad (13)$$
$$\sum_{j=1}^{g} m_j \log\left(1 + \frac{3}{2(M_g-1)}\Omega_j w_j q_j \rho/m_j\right) - u\left(\sum_{j=1}^{g} w_j - 1\right)$$

When $Q_j=2(M_g-1)m_j/3\Omega_j q_j \rho$, $w_j^*$ ($j=1, \ldots, g$) can be obtained by repeatedly solving equations through the "water pouring" algorithm, as in the following Equation (14)

$$\frac{\partial F}{\partial w_j} = m_j(Q_j + w_j)^{-1} - u = 0, \text{ (where } j = 1, \ldots, g) \quad (14)$$

In the following description, Such a scheme is referred to as "power allocation scheme 1 (PAS1)." In a high TSNR region, a power allocation weight may be expressed as the following Equation (15)

$$w_j^* = m_j \bigg/ \sum_{j=1}^{g} m_j, \text{ (where } j = 1, \ldots, g) \quad (15)$$

In the following description, a scheme employing Equation (15) as a specific transmission power level will be referred to as "power allocation scheme 2 (PAS2)."

[Quasi-Optimal Power Allocation for MPSK Symbol]

The SER of the OSTBC having an MPSK symbol in a subset $A_g$ may be expressed as the following Equation (16)

$$P_{M_g PSK} = \quad (16)$$
$$\int_0^\infty \left(2Q\left(\sqrt{2x}\sin\frac{\pi}{M_g}\right) - \frac{1}{\pi}\int_{\frac{\pi}{2} - \frac{\pi}{M_g}}^{\frac{\pi}{2}} e^{-x\left(\sin\frac{\pi}{M_g}\right)\csc^2\theta} d\theta\right) f_\eta(x) dx$$

When $M_g \geq 4$, Equation (16) may be approximated by $P_{M_g PSK} \approx \int_0^\infty 2Q(\sqrt{2x}\sin(\pi/M_g)) f_\eta(x) dx$. The SER of the BPSK and QPSK in an additive white Gaussian noise (AWGN) channel may be approximated by the Equations (17) and (18)

$$P_{BPSK} \approx \int_0^\infty Q(\sqrt{2x}) f_\eta(x) dx \quad (17)$$

$$P_{QPSK} \approx \frac{1}{2}\int_0^\infty Q(\sqrt{x}) f_\eta(x) dx \quad (18)$$

When the Chernoff bound is applied to Q-function, the upper bound of the SER may be derived as the following Equations (19) to (21)

$$P_{M_g PSK} \approx \int_0^\infty 2Q\left(\sqrt{2x}\sin(\pi/M_g)\right) f_\eta(x) dx \leq \quad (19)$$
$$2\int_0^\infty e^{-x\sin^2(\pi/M_g)} f_\eta(x) dx$$
$$= 2\Phi_\eta(-\sin^2(\pi/M_g))$$
$$= 2\prod_{j=1}^{g}(1 + \sin^2(\pi/M_g)\Omega_j w_j q_j \rho/m_j)^{-m_j}$$

$$P_{BPSK} \approx \int_0^\infty Q(\sqrt{2x}) f_\eta(x) dx \leq \int_0^\infty e^{-x} f_\eta(x) dx \quad (20)$$
$$= \Phi_\eta(-1)$$
$$= \prod_{j=1}^{g}(1 + \Omega_j w_j q_j \rho/m_j)^{-m_j}$$

$$P_{QPSK} \approx \frac{1}{2}\int_0^\infty Q(\sqrt{x}) f_\eta(x) dx \leq \frac{1}{2}\int_0^\infty e^{-\frac{1}{2}x} f_\eta(x) dx \quad (21)$$
$$= \frac{1}{2}\Phi_\eta\left(-\frac{1}{2}\right)$$
$$= \frac{1}{2}\prod_{j=1}^{g}\left(1 + \frac{1}{2}\Omega_j w_j q_j \rho/m_j\right)^{-m_j}$$

In brief, the quasi-optimal power allocation weights can be obtained by applying $Q_j = m_j/\sin^2(\pi/M_g)\Omega_j w_j q_j \rho$, $Q_j = m_j/\Omega_j w_j q_j \rho$ and $Q_j = 2m_j/\Omega_j w_j q_j \rho$ for constellations of the MgPSK ($M_g > 4$), BPSK and QPSK, respectively, to Equation 14 and using the Lagrangian method. It should be noted that a power allocation in a high TSNR region is based on Equation 15.

[Selection of Antenna Subset Using Quasi-Optimal Power Allocation Scheme]

The quasi-optimal SERs $P_{A_g}^{sub}$ of MQAM and MPSK symbols can be obtained by applying a power allocation weight obtained from Equations (14) and (15) to Equations (8) and (9).

When the above method is applied to an available optimal antenna subset, a quasi-optimal power allocation scheme similar to PAS1 and PAS2 can be easily obtained.

Figure 4:
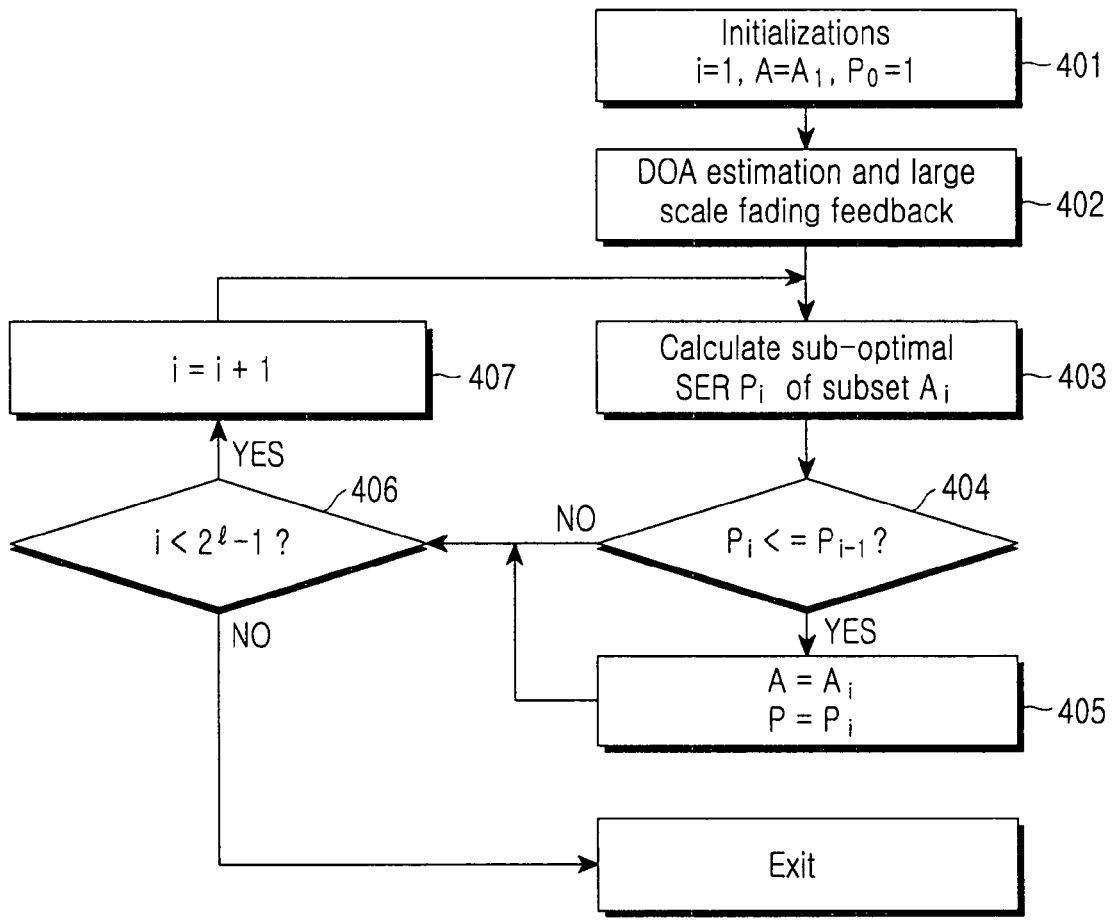
FIG. 4 is a flowchart illustrating an adaptive transmission power allocation procedure for beamforming combined with the OSTBC in the distributed wireless communication system according to an embodiment of the present invention.

FIG. 4 is a flowchart illustrating an example of an adaptive transmission power allocation procedure for combined beam-forming with the OSTBC in a distributed wireless communication system, according to an embodiment of the present invention in which specific steps are required for obtaining an optimal subset. As illustrated in the flowchart of the example power allocation scheme illustrated in FIG. 4, the following steps are performed to obtain an optimal subset:

First, initialize. That is, i, A, P and $P_0$, are set to i=1, A=$A_i$, P=$P_0$=1 respectively, in which A represents an optimal antenna subset and P represents a quasi-optimal SER (step 401).

Estimate a DOA for each sub-array, and create a array response vector for each estimated antenna sub-array. Herein, it is assumed that large-scale fading information is fed back, together with a Nakagami fading parameter, to the receiver by the MT, and the MT is provided with the information (step 402).

Calculate the quasi-optimal SER $P_i$ for a subset $A_i$ by using a quasi-optimal power allocation scheme selected from the group consisting of at least one of PAS1 and PAS2 (step 403).

Then, determine that the calculated quasi-optimal SER $P_i$ is equal to or less than $P_{i-1}$ (step 404), and if $P_i \leq P_{i-1}$, then set $A=A_i$ and $P=P_i$ (step 405). According to such a process, an optimal SER (i.e., a minimum SER) is identified among SERs for each subset, and a subset corresponding to the optimal SER can be identified.

Thereafter, determine if $i \leq 2^l - 1$ (step 406), and when $i < 2^l - 1$, then increment i by 1 (i.e., i=i+1) (step 407) and repeat the calculating step for the SER in the corresponding subset. Otherwise, if $i \geq 2^l - 1$, then terminate the program and output A and P.

[Numerical Result]

In order to examine the performance of the scheme according to the present invention, for example, a DA topology of which (n, 1, $q_l, \ldots, q_l$, 1) corresponds to (4, 2, 2, 2, 1) is considered, in which 4 DAs are grouped into 2 sub-arrays, the receiver includes one antenna, and normalized large-scale fading is $\Omega_1=1$ and $\Omega_1=0.6$. The target capacity is 2 bits/s/Hz. "m" parameters for sub-array 1 and sub-array 2 are 1 and 2, respectively. The antenna sub-arrays include $A_1$ (sub-array 1), $A_2$ (sub-array 2) and $A_3$ (two sub-arrays). The OSTBC of the greatest rate (rate of 1) is transmitted to $A_3$, and a pure beamforming is applied to $A_1$ and $A_2$. The modulation type of QPSK is employed.

Figure 5:
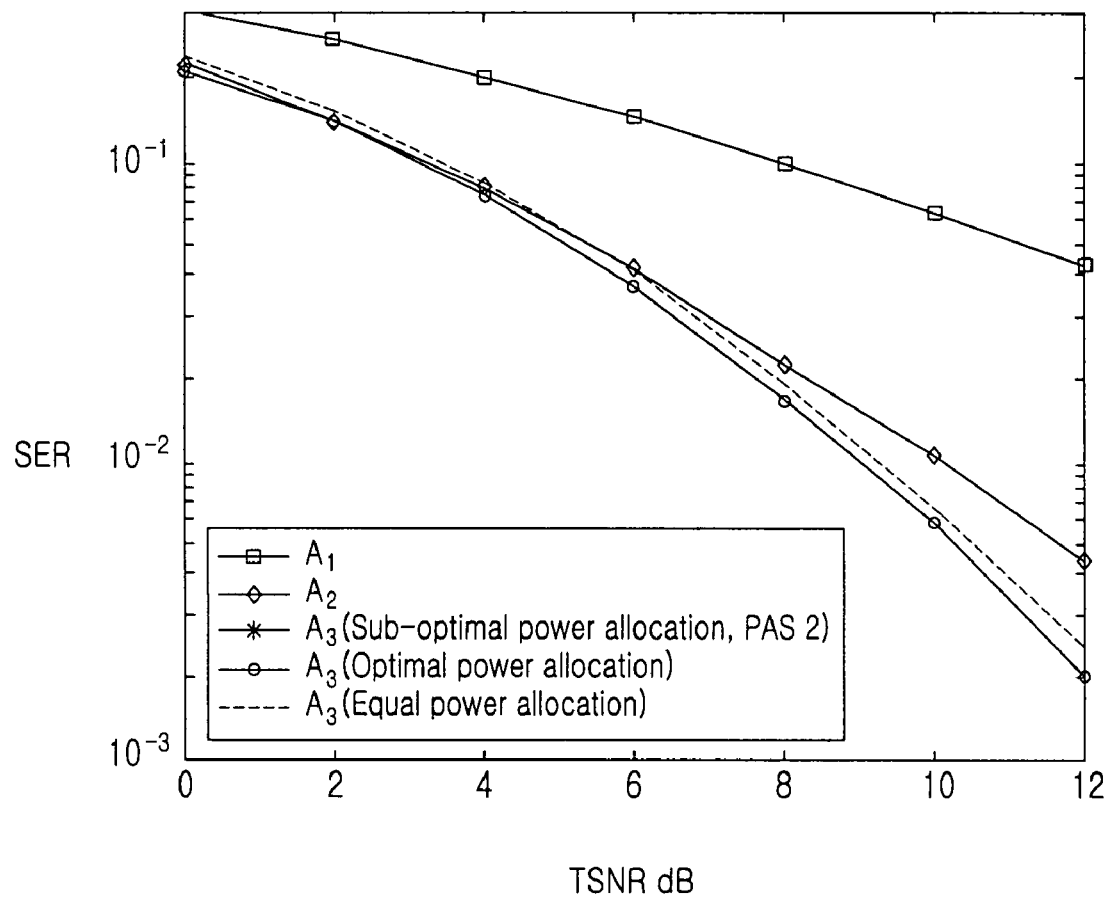
FIG. 5 is a graph illustrating the performance characteristics of an adaptive transmission power allocation scheme for beamforming combined with the OSTBC in the distributed wireless communication system according to an embodiment of the present invention.

FIG. 5 is a view illustrating the SER performances of subsets $A_1$, $A_2$ and $A_3$ to which a quasi-optimal power allocation is applied, the SER performance of subset $A_3$ to which the same power allocation is applied, and the SER performance of subset $A_3$ to which an optimal power allocation, obtained through a numerical optimization, is applied. Referring to FIG. 5, it can be understood that a quasi-optimum performance for subset $A_3$, according to the present, invention is similar to that of an optimal power allocation. That is, at a random transmission power level, the SER performance of an antenna subset selected by a quasi-optimal power allocation is substantially similar to that of an antenna subset selected by an optimal power allocation.

Referring to FIG. 5, it can be understood that, compared with a pure beamforming, the combination of OSTBC and beamforming, according to the present invention, has significant advantages in performance. That is, with respect to beamforming of $10^{-1}$ SER in subset $A_1$, a power allocation scheme according to the present invention decreases a transmission power by 7 dB, as compared with a pure beamforming. Also, with respect to beamforming of $10^{-3}$ SER in subset $A_2$, the power allocation scheme according to the present invention decreases the transmission power by 1 dB, as compared with the pure beamforming.

As described above, the present invention provides an adaptive quasi-optimal scheme for a transmission power allocation for beamforming combined with OSTBC in a flat Nakagami fading channel within a DWCS in order to minimize the SERs of MQAM and MPSK symbols, on an assumption that there are a large-scale fading and a Nakagami fading parameter in a transmitter. When there is a change of a large-scale fading information, the transmission power allocation may be changed depending on a change of the large-scale fading information.

Since the change of the large-scale fading information varies with a scale of a long time, the large-scale fading information is very restrictive for use as a feedback according to the present invention. The present invention provides a very simple but effective quasi-optimal power allocation scheme. According to the quasi-optimal scheme for a transmission power allocation, the transmission power is allocated in proportion to the fading parameter of each sub-array. Such scheme for transmission power allocation is correct in a high transmission power area.

It is proved, in the selection of antennas, that a performance according to the present invention is substantially similar to an optimal performance in a quasi-static fading environment at a random transmission power level. Compared with a pure beamforming scheme in one sub-array among the multiple sub-arrays, a very large performance gain can be obtained according to the present invention.

In this manner, according to an adaptive quasi-optimal transmission power allocation scheme for beamforming combined with the OSTBC, it is possible to obtain a macro-diversity gain, a maximum diversity gain and an array gain. The adaptive quasi-optimal transmission power allocation scheme according to the present invention can be widely applied to 3G or 4G wireless communication systems.

While the adaptive transmission power allocation scheme for combined beamforming with OSTBC in a DWCS has been illustrated and described with reference to certain embodiments thereof, it will be understood by those skilled in the art that these embodiments are examples presented for discussion purposes only and to illustrate applications of the present invention. Therefore, it is obvious to those skilled in the art that various changes in form and details may be made to these example embodiments without departing from the spirit and scope of the invention as defined by the appended claims. Accordingly, the scope of the invention is not to be limited by the above example embodiments but by the claims and the equivalents thereof.

REFERENCE DOCUMENTS

[1] W. Roh and A. Pauiraj, "MIMO channel capacity for the distributed antenna systems," in *Proc. IEEE VTC'02*, vol. 2, pp. 706709, 2002.

[2] H. Zhuang, L. Dai, L. Xiao and Y. Yao, "Spectral efficiency of distributed antenna system with random antenna layout," *Electronics Letters*, vol. 39, no. 6, pp. 495-496, 2003.

[3] S. Zhou, M. Zhao, X. Xu, J. Wang, and Y. Yao, "Distributed wireless communication system: A new architecture for future public wireless access," *IEEE Commun. Mag.*, vol. 41, no. 3, pp 108-113, 2003.

[4] V. Tarokh, H. Jafarkhani, and A. R. Calderbank, "Space-time block codes from orthogonal designs," *IEEE Trans. Inform. Theory*, vol. 45, pp. 14561467, July 1999.

[5] P. Li, L. R. Zhang and H. C. So, "On a Combined Beamforming/Space-Time Coding," *IEEE Comm. Lett.*, vol. 8, no. 1, pp. 15-17, Janurary 2004.

[6] R. W. Heath Jr. and A. Pauiraj, "Multiple antenna arrays for transmitter diversity and space-time coding," in *Proc. IEEE Int. Conf on Communications (ICC'99)*, vol. 1, June 1999, pp. 3640.

[7] H. Shin and J. H. Lee, "Exact symbol error probability of orthogonal space-time block codes," in *Proc. IEEE Globecom '02*, Taipei, Taiwan, November 17-21, pp. 1547-1552, 2002.

What is claimed is:

1. An apparatus for adaptively allocating transmission power for beamforming combined with orthogonal space-time block codes (OSTBC) in a distributed wireless communication system, the apparatus comprising:
   a plurality of geographically distributed sub-arrays for beamforming, each sub-array of said plurality comprising a plurality of distributed antennas placed in random groups;
   and a central processing unit for
      identification of a performance of each subset of the sub-arrays by applying a predetermined power allocation scheme thereto, each said subset being obtained by combining the sub-arrays using a Nakagami fading parameter and information about large-scale fading of each sub-array of the sub-arrays fed back from a receiving party,
      determination of a subset having a best identified performance as an optimal subset according to the identified performances thereof, and
      performance of power allocation based on the subset determined as the optimal subset,
   wherein the each subset is a random combination of the plurality of sub-arrays.

2. The apparatus as claimed in claim 1, wherein the identification of a performance of each subset is performed through identification of a symbol error rate, in which a subset having a lowest identified symbol error rate is determined as the optimal subset.

3. The apparatus as claimed in claim 1, wherein the performance of the predetermined power allocation further comprises allocation of transmission power proportional to the Nakagami fading parameter "m" for each sub-array of the plurality of sub-arrays.

4. The apparatus as claimed in claim 3, wherein the identification of a performance of each subset further includes identification of a symbol error rate thereof in which a subset having a lowest rate identified symbol error rate is determined as the optimal subset.

5. A method for adaptively allocating transmission power for beamforming combined with orthogonal space-time block codes (OSTBC) in a distributed wireless communication system including a plurality of geographically-distributed sub-arrays for beamforming, each of which comprises a plurality of distributed antennas placed in random groups, the method comprising the steps of:
   estimating a direction-of-arrival (DOA) for each antenna sub-array of the plurality of geographically-distributed sub-arrays;
   creating an array response vector for each antenna sub-array using the estimated DOA thereof;
   obtaining at least one subset of each said antenna sub-array based on the array response vector;
   determining an obtained subset having a lowest symbol error rate as an optimal subset;
   allocating transmission power to each said at least one obtained subset based on the subset determined as the optimal subset; and
   within each sub-array, performing beamforming combined with orthogonal space-time block codes using said allocated transmission power,
   wherein the each subset is a random combination of the plurality of sub-arrays.

6. The method of claim 5, wherein the obtaining step further comprises the steps of:
   feeding back information from a receiving party about large-scale fading of each antenna sub-array, and
   combining each antenna sub-array into at least one subset in accordance with the Nakagami fading parameter "m" of the antenna sub-array and the fed back information thereof, and
   obtaining a symbol error rate for each at least one subset.

7. The method of claim 5, wherein the allocating step further comprises the step of allocating transmission power to each obtained subset such, that said allocation is proportional to a Nakagami fading parameter "m" of each sub-array thereof.

* * * * *